United States Patent
Henecke

(10) Patent No.: US 7,913,721 B2
(45) Date of Patent: Mar. 29, 2011

(54) CONTAINER FOR THE COLLECTION, STORAGE AND DISPOSAL OF LIQUIDS AND METHOD

(76) Inventor: John Henecke, Cedar Rapids, IA (US)

( * ) Notice: Subject to any disclaimer, the term of this patent is extended or adjusted under 35 U.S.C. 154(b) by 1045 days.

(21) Appl. No.: 11/555,528

(22) Filed: Nov. 1, 2006

(65) Prior Publication Data

US 2008/0099098 A1    May 1, 2008

(51) Int. Cl.
*B65B 1/04*    (2006.01)
(52) U.S. Cl. .................. 141/86; 141/10; 141/316
(58) Field of Classification Search ............ 141/2, 10, 141/86, 98, 314–316; 206/216, 223; 184/1.5
See application file for complete search history.

(56) References Cited

U.S. PATENT DOCUMENTS

| | | | | |
|---|---|---|---|---|
| 4,010,863 A * | 3/1977 | Ebel | | 220/573 |
| 4,054,184 A * | 10/1977 | Marcinko | | 184/1.5 |
| 4,098,398 A * | 7/1978 | Meyers | | 206/223 |
| 4,099,598 A * | 7/1978 | Clinard | | 184/106 |
| 4,301,841 A * | 11/1981 | Sandow | | 141/98 |
| 4,442,936 A * | 4/1984 | Densham | | 206/223 |
| 4,485,853 A * | 12/1984 | Gunderson | | 141/1 |
| 4,640,431 A * | 2/1987 | Harrison | | 220/573 |
| 4,974,647 A | 12/1990 | Eastom | | |
| 5,092,457 A * | 3/1992 | Islava et al. | | 206/223 |
| 5,180,033 A | 1/1993 | Wilson | | |
| 5,190,085 A | 3/1993 | Dietzen | | |
| 5,285,824 A | 2/1994 | Krstovic | | |
| 5,375,703 A * | 12/1994 | Deuber | | 206/223 |
| 6,068,032 A * | 5/2000 | Milner | | 141/382 |
| D478,920 S | 8/2003 | Huckabee | | |
| 6,742,551 B2 * | 6/2004 | Davis et al. | | 141/98 |
| 6,874,549 B1 | 4/2005 | Williams | | |

FOREIGN PATENT DOCUMENTS

CA         1064865 A    10/1979

* cited by examiner

*Primary Examiner* — Timothy L Maust
(74) *Attorney, Agent, or Firm* — McKee, Voorhees & Sease, P.L.C.

(57) ABSTRACT

The present invention is a recyclable oil drain pan intended to encourage proper disposal of used motor oil. The recyclable oil drain pan generally consists of a stiff outer container and a flexible inner container. The stiff outer container has a recessed upper surface that can be sloped towards an opening that passes through the upper surface. The opening of the outer container connects to the opening of a flexible inner container that receives the used oil. The opening can be sealed via a cap or plug to effectively contain the used motor oil. Preferably the entire apparatus would be recyclable.

33 Claims, 6 Drawing Sheets

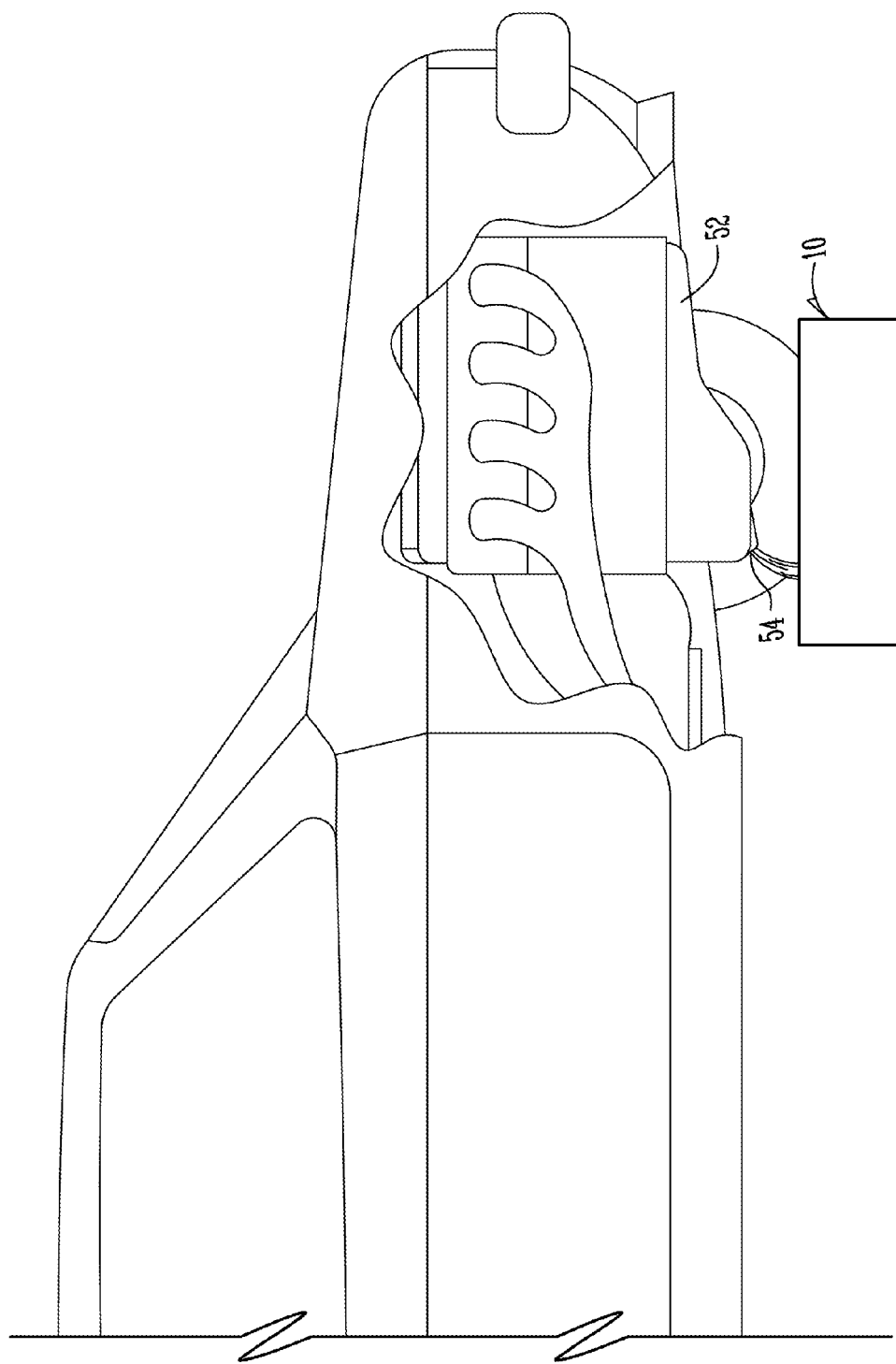

CONTAINER FOR THE COLLECTION, STORAGE AND DISPOSAL OF LIQUIDS AND METHOD

FIELD OF THE INVENTION

This invention relates generally to an apparatus and method for the collection, storage and disposal of used and spent liquids, and more specifically to a recyclable oil drain pan container for collecting and storing used automotive oil.

BACKGROUND OF THE INVENTION

Recycling is the process of recovering useful materials from already used or waste products. Most people are aware that newspapers, aluminum cans, and glass and plastic bottles can be recycled. In addition to these common household products, more and more industrial waste is being recycled. Generally, individuals and corporate entities recycle in an attempt to balance the convenience of disposal of the used product with the desire to maintain a clean and healthy environment.

A common source of pollutants that contaminate the environment is used motor oil from cars, trucks, motorcycles, boats, recreational vehicles, lawn mowers, etc. After prolonged use, motor oil breaks down and needs to be replaced. Often this replacement of the used motor oil takes place at residential homes in a garage or driveway. More than 43 million United States do-it-yourself residents change their own oil. It is estimated that these individuals consume 350 million gallons of motor oil each year. Each gallon of used oil must be collected and properly disposed of to prevent fouling of the environment.

More often than not, the collected used oil is not properly disposed of. The truly calloused do-it-yourself simply pours the collected used motor oil down the nearest storm drain. The more conscientious individual will gather the used oil into a container, maybe even a leak proof container, and dispose of the entire container and oil in a trash receptacle. Though the later method seems more environmentally friendly, neither method is desirable. Both methods can lead to the contamination of the local water supply as the oil will pass through the soil and collect in the water reservoir. The contamination of the water supply can lead to all sorts of illnesses and diseases if consumed.

Recent efforts have been made by both private and governmental agencies to increase the amount of used motor oil that is recycled. These efforts have the two-fold benefit of protecting the environment as well as providing a ready source of used motor oil that can be recycled to be used again as motor oil or as other petroleum based products. Most service stations, repair facilities and quick lube facilities will accept used motor oil. Local government recycling centers can also be found. Each of these locations has procedures for recycling used oil. An almost universal requirement is that the used oil must be transported and stored in a container that can be sealed, stored and is generally leak proof.

U.S. Pat. No. 5,180,033 discloses a recyclable oil changing device that uses a two part system to collect and store used motor oil. The device has an outer cardboard container and an inner flexible polypropylene container that captures and contains used motor oil. Once the oil has been captured within the large mouthed bag, the bag is closed with a sealing device. The closed bag is stored in the cardboard box by folding the lids of the cardboard box about the inner container. The U.S. Pat. No. 5,180,033 patent fails to provide a convenient means of funneling the used motor oil into the bag. Additionally, the sealing mechanism of the U.S. Pat. No. 5,180,033 patent does not conveniently lend itself to quick and easy cleanup.

Canadian Patent No. 1,064,865 also discloses a fluid collector for collecting oil from a drain opening of a motor vehicle crankcase or engine oil pan. The fluid collector contains a sealed container carrying a folded bag therein. When the device is used, the side of the outer container is removed and the inner liner is expanded outside of the outer container to accommodate the collection of the used oil. This patent does not offer a protected storage container for the storage of the used oil after it is collected. Additionally, for the oil to be collected, the top of the outer container has to be removed completely.

It is therefore a primary feature of the present invention to provide an apparatus for collecting fluids that has a stiff outer container with a recessed top surface that connects to a flexible inner liner via an opening in the top surface wherein the opening can be closed with a cap.

It is a further feature of the present invention to provide a collection device that has a recessed top surface that slopes towards one end and the opening to the inner liner is positioned at the lower end of the slope.

Another feature of the present invention is the provision of a coating along the recessed portion of the top surface that masks discoloration of the outer container after the collection of the fluids. The coating is also adaptable to prevent absorption of the collected fluids by the outer container.

Yet another feature of the present invention is the provision of a flexible inner liner or bag that can contain collected fluids, specifically used motor oil that may reach temperatures as high as 250° F.

Still another feature of the present invention is the provision of an outer container that is collapsible to facilitate easy storage and disposal of the fluid collection apparatus.

A further feature of the present invention is the provision of a removable oil scraping device from the bottom surface of the collection unit that allows a user of the system to direct excess oil from the top surface of the of the outer container towards the openings.

Yet another feature of the present invention is the provision of a stiff outer container that is integrally formed of a single piece that can be assembled into a container that has a recessed top and provides an interior space that can receive and store a flexible inner liner.

Yet anther feature of the present invention is the provision of a fluid collection device that facilitates the recycling of used motor oil while also being predominantly recyclable itself.

A still further feature of the present invention is the provision of a new method for collecting, storing, and disposing of used fluids, such as motor oil.

BRIEF SUMMARY OF THE INVENTION

The present invention relates to a recyclable container and method for collecting oil from an automobile during an oil change. The drain pan container comprises a collapsible cardboard box that has a tapered and recessed top surface (much like a typical drain pan) with a hole in the top surface near one end of the box. The hole in the top surface communicates with and connects to an opening in an inner bag that stores the used oil. The drain pan is placed below the drain plug of a motor or crankcase before the drain plug is removed. Once the drain plug is removed, the used oil drains onto the top surface of the box and then flows down through the hole/opening and into the plastic bag contained within the cardboard box. Once all of the used oil is collected in the bag, a plastic cap or plug is inserted into the hole and the entire container can be taken to a recycling center. Each of the parts (cardboard box, plastic bag, and plastic plug) are recyclable.

BRIEF DESCRIPTION OF THE DRAWINGS

FIG. 10 is a perspective view of one method of utilizing an embodiment of the recyclable oil pan container.

DETAILED DESCRIPTION OF THE PREFERRED EMBODIMENT

The present invention will be described as it applies to its preferred embodiment. It is not intended that the present invention be limited to the described embodiment. It is intended that the invention cover all modifications and alternatives, which may be included within the spirit and scope of the invention.

Figure 1:
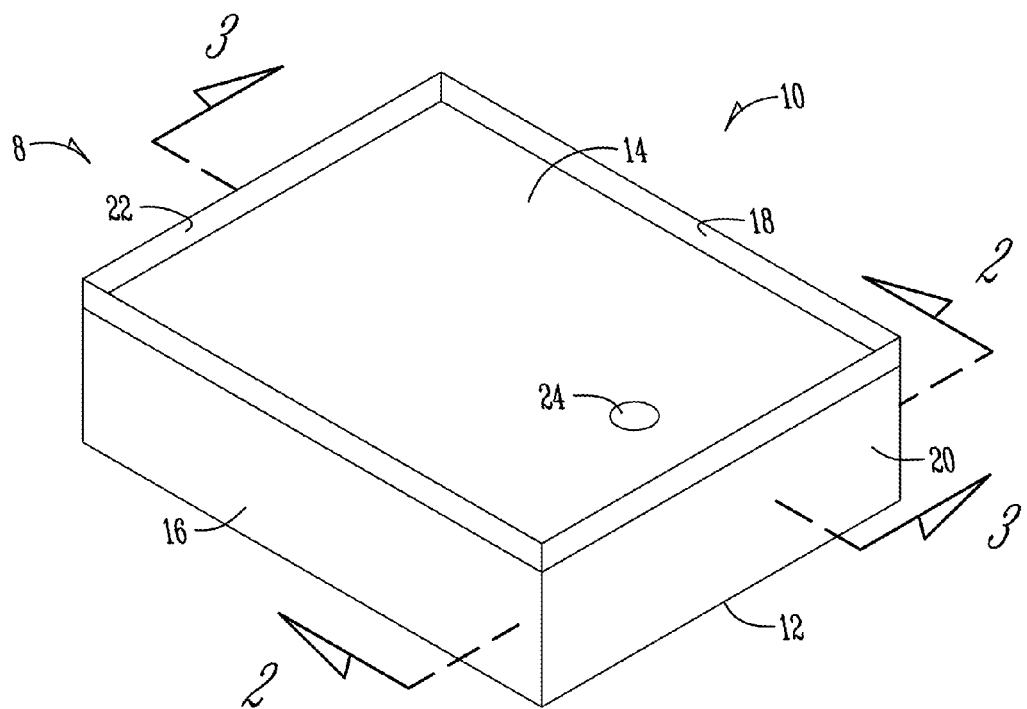
FIG. 1 is a perspective view of an embodiment of the recyclable oil pan container.

FIG. 1 generally depicts a perspective view of one embodiment of the recyclable oil pan 8 having a stiff outer container 10. The outer container 10 has a bottom surface 12 and a top surface 14. The stiff outer container also has four side walls 16, 18, 20 and 22. The top surface 14 has an opening 24 generally located near one end of the stiff outer container 10. The stiff outer container 10 can be made of any material sufficiently rigid to hold its own form. Preferably the stiff outer container 10 is constructed of cardboard, but it could be constructed of other wood based products, as well as plastic, polypropylene and fiberglass.

Figure 2:
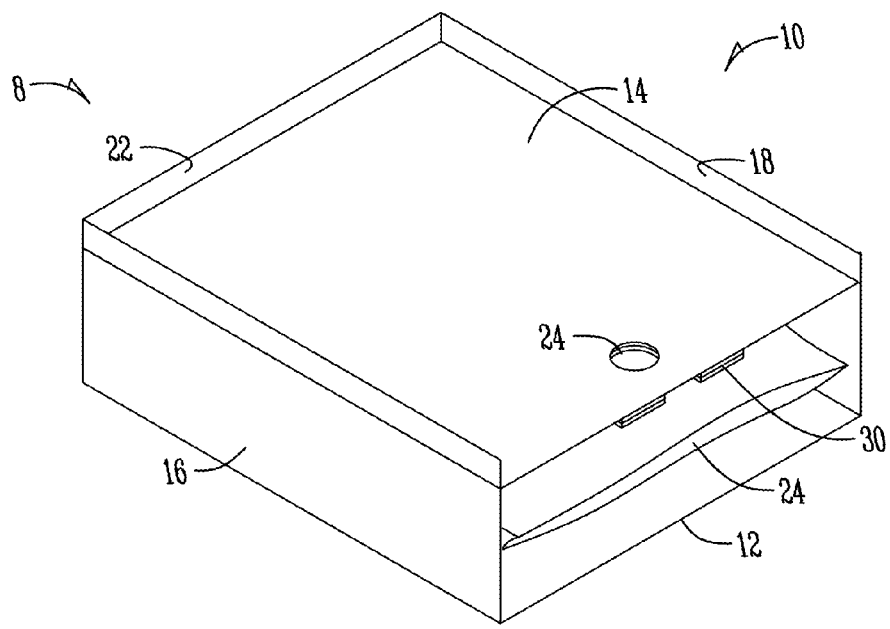
FIG. 2 is an exploded view of an embodiment of the recyclable oil pan container without a front panel.
Figure 3:
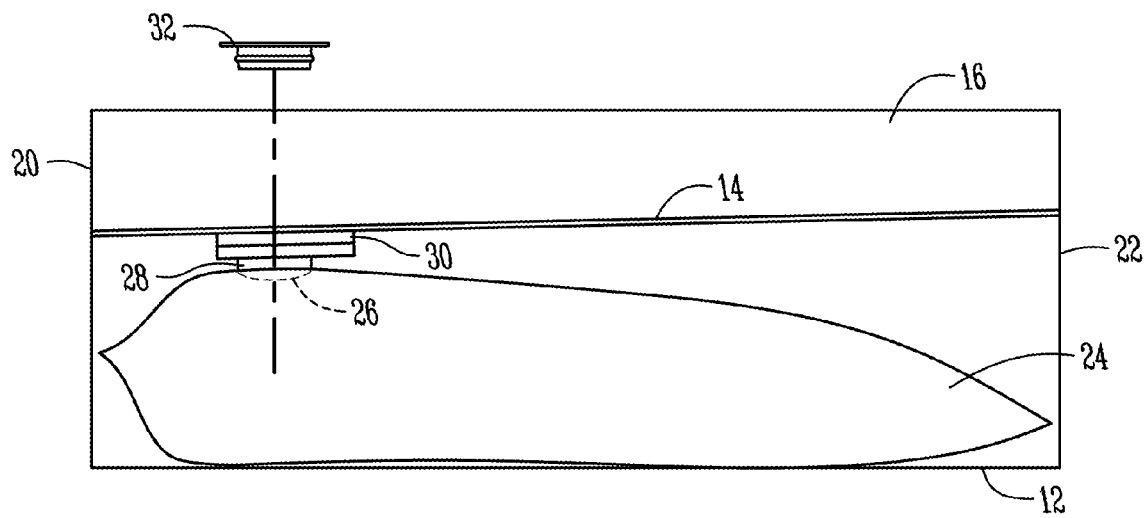
FIG. 3 is a cross-sectional view of an embodiment of the recyclable oil pan container.
Figure 4:
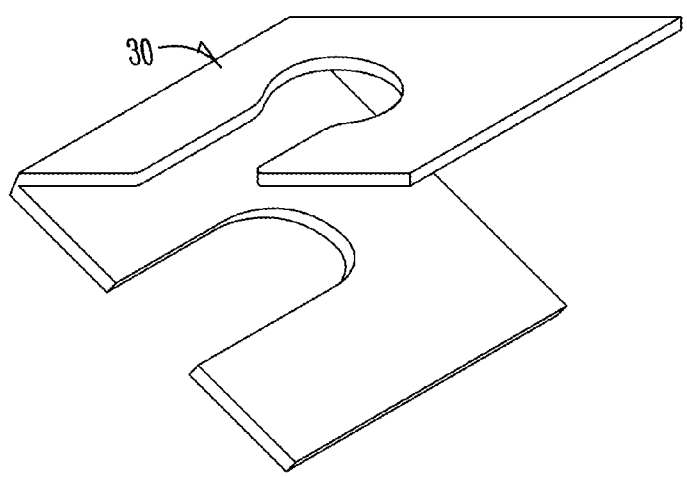
FIG. 4 is a perspective view an opening insert.

The opening 24 in the top surface 14 is generally aligned and connected to an opening 26 of the inner liner or bag 24. The flexible inner liner 24 can have a reinforced throat 28 that spans between the top surface opening 14 and the bag's opening 26. The bag is held in place at the opening via an insert 30 that can be attached to the inner surface of the top piece 14. An example of a liquid packaging bag is the DuPont Liquid Packaging Systems bag product specification BP3G-31. Preferably the inner bag would be able to withstand temperatures upward of 250° F. FIGS. 2 and 3 generally depict the placement of the inner liner 24 within the stiff outer container 10.

The openings 14 and 26 are preferably sealed by a removable cap or plug 32. The cap or plug 32 is designed to be inserted into the openings 14 and 26 to provide a seal when a fluid is contained within the inner liner 24. Preferably the cap or plug 32 would be designed to prevent the cap 32 from being erroneously forced all the way through the openings. Additionally, the cap 32 needs to be removable so that the openings could be exposed to allow fluids to pass through the openings. An example of an acceptable tapered cap or plug is the WW series cap plugs produced by Caplugs. Other acceptable plugs could include caps or plugs that could be inserted into the opening as well as threaded into the openings.

FIG. 3 is a cross-sectional view of the oil pan 8 that depicts the top surface 14 being recessed from the upper edges of the side walls 16, 18, 20, and 22. The recessing of the top surface 14 allows for the collection of poured, drained or spilled fluids with a decreased chance of spills. Further, the top surface 14 is not necessarily parallel with the bottom surface 12. FIG. 3 generally depicts the top surface sloping from one end of the stiff outer container 10 to the other. It is also contemplated that the top surface 14 could slope from side to side or slope in some other combination of manners wherein the top surface 14 would form a crease along the upper surface. A benefit to the slope of the upper surface 14 is that it creates a low point to locate the openings 14 and facilitate the drainage of the captured fluids into the inner container 24.

The upper surface 14 and exposed inner surfaces of the side walls 16, 18, 20, 22 that form the recessed pan can be chemically coated to further facilitate the capture of the fluids to be drained into the inner container 24. An exemplary coating that would both darken the recessed portion and provide an oil resistant coating to the recessed surfaces would be Hystar BCMI 90 Black ink part number 1015104 produced by Inx International Ink Company. A second coating could be applied to both the recessed portion of the drain pan 8 and the entire exterior surface of the outer container 10 to provide a grease and water resistant surface. An example of the secondary coating would be Inx Grease and Water Resistant POV part number 10144337 produced by Inx International Ink Company.

Figure 5:
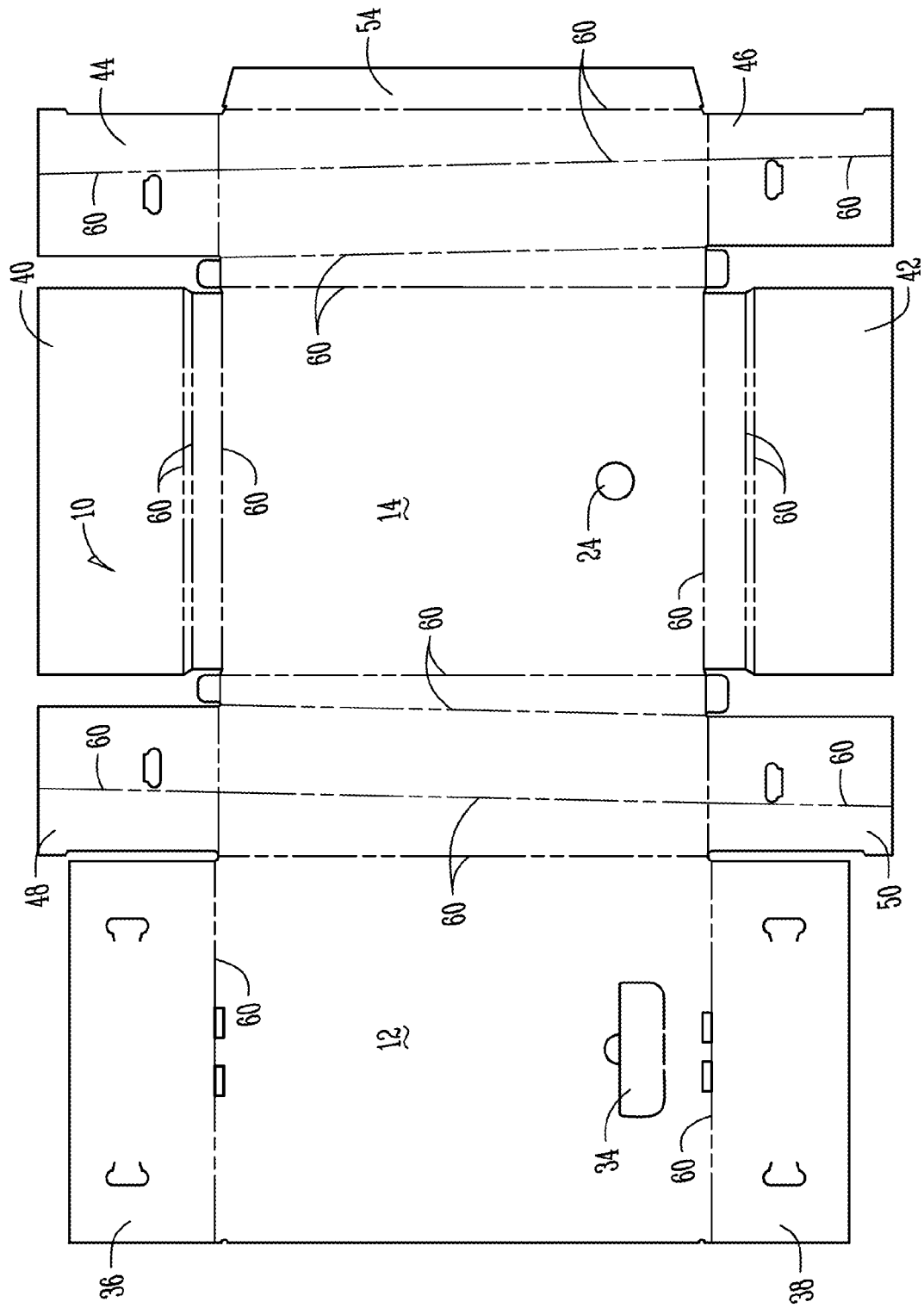
FIG. 5 is a plan view of a single sheet construction of an integrally formed outer container.

It is preferable from a manufacturing perspective to form the recyclable oil pan's outer container 10 from a single sheet material. It is contemplated that the stiff outer container 10 could be assembled from multiple components, but it is preferable that only a single sheet be used. FIG. 5 depicts an example of one possible layout of a sheet design for the oil pan's outer container. FIG. 5 shows the removable scraper 34 being integrated into the bottom surface 12 of the outer container 10. FIG. 5 also shows the first and second flaps for the bottom surface 36, 38, the top surface 40, 42 and the four side wall end flaps 44, 46, 48, 50. These flaps are used during the assembly process. Additionally, FIG. 5 discloses multiple score lines 60 used to assemble the oil pan's outer container.

FIGS. 6 through 9 depict the general assembly procedure for assembling the recyclable oil pan. Before the oil pan 8 is shipped to an end user, the glue tab 54 is attached to the inner face of the bottom surface 12 by bending the box along the predefined perforation marks. The inner container 24 is then connected to the inner portion of the oil pan 8 so that the openings 14 and 26 align. The box is then collapsed upon itself along the perforated lines formed in the side walls 16 and 18.

Figure 6:
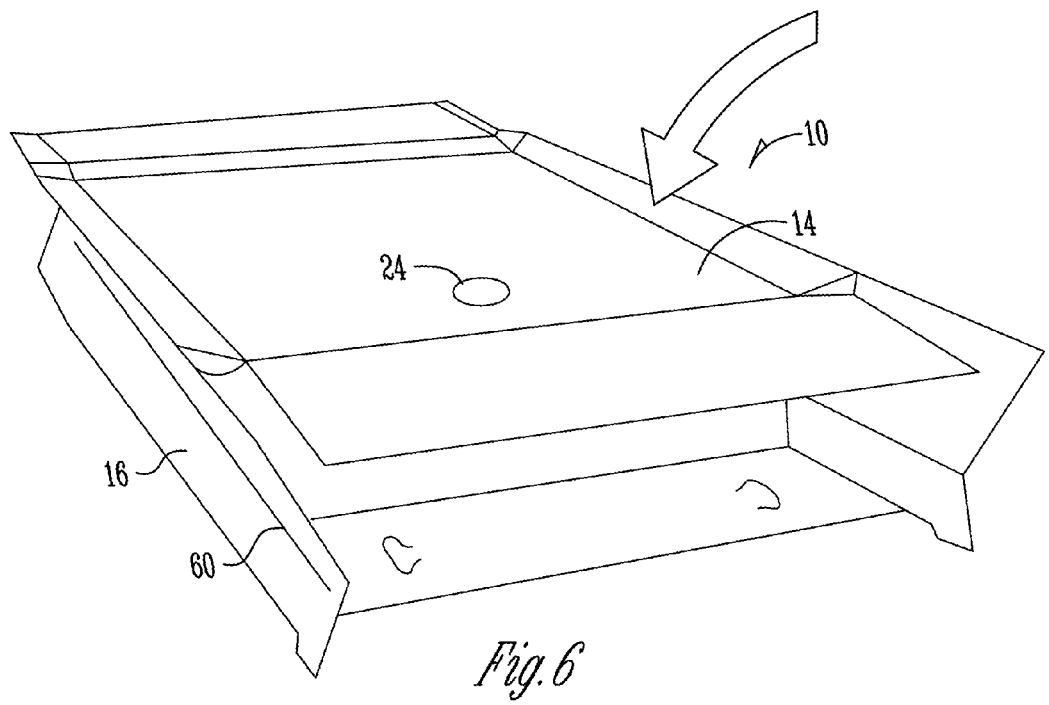
FIGS. 6 through 9 are sequential views of an embodiment of the assembly of a recyclable oil pan container.
Figure 7:
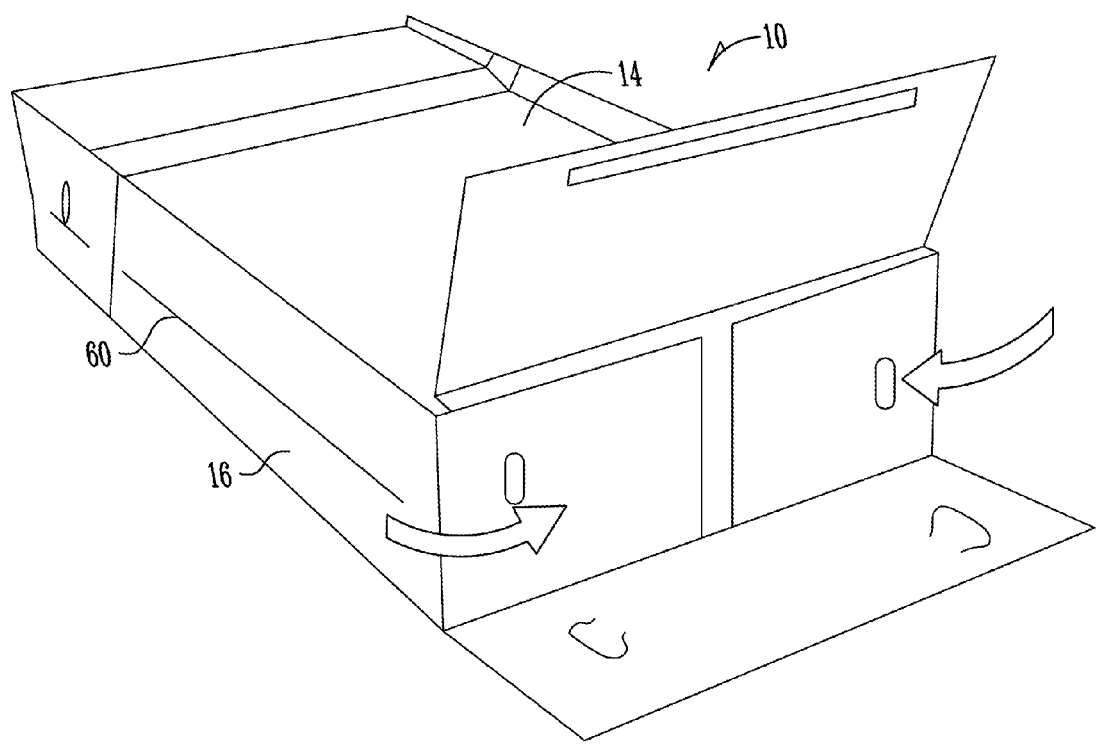
Figure 8:
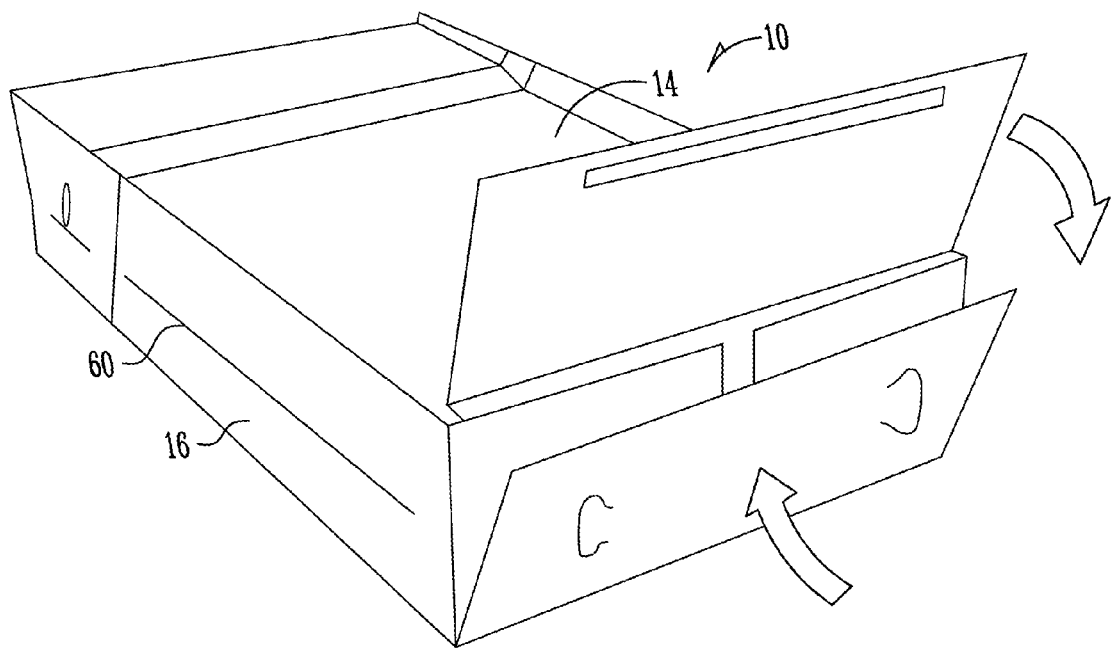
Figure 9:
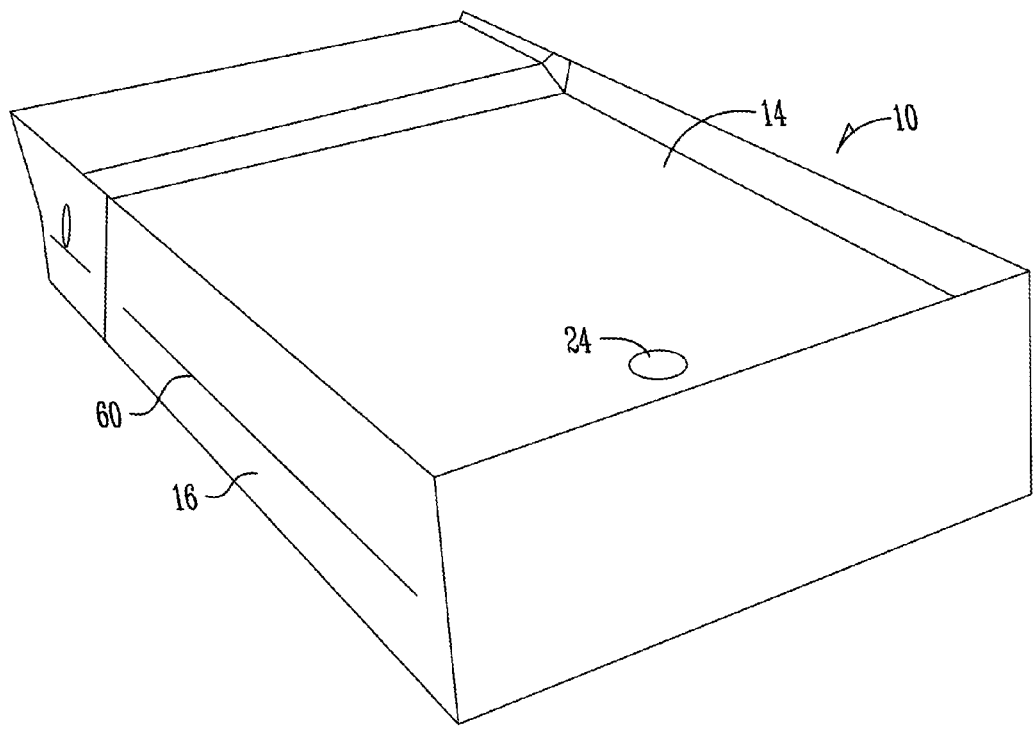

When the recyclable oil pan arrives at the end user, the stiff outer container 10 is assembled by expanding the folds along the side walls 16 and 18 as seen in FIG. 6. As seen in FIG. 7, the four side wall end flaps 44, 46, 48 and 50 are then folded inward. After the end flaps are folded in, the top and bottom end flaps 40, 42 and 36, 38 respectively are folded inward to form end walls 20 and 22. The flaps can be secured to the box in the proper position via an adhesive tape, double stick tape, or some combination of tabs and slots (not shown).

The oil pan 8 is typically used to collect used motor oil drained from the engine of an automobile. FIG. 10 depicts generally how the oil pan 8 is placed under the motor 52 such that the oil pan is below the drain plug 54. Before the oil pan 8 is placed below the drain plug 54, the plug 32 in the opening 24 and the scraper 34 is removed from the stiff outer container 10. The oil pan 8 is then placed under the drain plug 54 and the plug 54 is removed, allowing the motor oil to drain into the pan 8. The oil then drains through the opening 26 into the inner liner 24. When the oil is completely drained from the motor 52, the drain plug is replaced in the motor 52.

The oil pan 8 is then removed from under the automobile. The user then uses the scraper 34 to remove the remaining oil from the top surface 14 by directing the remaining oil into the opening 24. After the remaining oil is captured in the inner liner 24, the plug or cap 32 is then placed in the opening 24, sealing the oil within the confines of the inner and outer containers. The captured used oil should then be taken to the nearest recycling center for proper disposal of the used oil.

The recyclable oil pan 8 is generally used to facilitate the removal and storage of used motor oil. The oil pan 8 can also be used for other collections and storage situations. The oil pan 8 could be used to capture other petroleum products, such as: grease, gas, diesel, gear lube, automatic transmission oil and etc. The collection pan 8 could also be used to capture and store paints, paint thinners, contaminated water, household chemicals, and medical waste. The only variation in the container would be the material of which the inner and outer containers would be constructed of.

A general description of the present invention as well as the preferred embodiment and alternative embodiments of the present invention have been set forth above. Those skilled in the art to which the present invention pertains will recognize and be able to practice additional variations in the methods and systems described which fall within the teachings of this invention.

What is claimed is:

1. An apparatus for collecting fluids, comprising:
    a stiff outer container having a first side, second side, third side, fourth side, each having an upper edge, the stiff outer container having a bottom and a top wherein the top is recessed from the upper edge of the first side, second side, third side and fourth side and has an opening passing through the top, the combination of sides, bottom and top defining an interior cavity;
    a flexible container disposed within the cavity of the stiff outer member having an opening passing through the flexible container wherein the opening of the flexible container aligns and attaches to the opening passing through the top of the stiff outer container;
    a cap that affixes to the openings; and
    a removable scraper integrated into the bottom of the stiff outer container.
2. The apparatus for collecting fluids of claim 1 wherein the top and bottom are not parallel.
3. The apparatus for collecting fluids of claim 2 wherein the openings passing through the stiff outer container and the flexible container is positioned at a low point along the top.
4. The apparatus for collecting fluids of claim 1 wherein the exterior surface of the top and the interior surface of the first side, second side, third side, and fourth side above the top are treated with a surface coating.
5. The apparatus for collecting fluids of claim 4 wherein the surface coating masks discoloration of the stiff outer container caused by the fluids.
6. The apparatus for collecting fluids of claim 4 wherein the surface coating prevents the stiff outer container from absorbing the collected fluid.
7. The apparatus for collecting fluids of claim 1 wherein the cap affixes to the openings by being inserted into the openings.
8. The apparatus for collecting fluids of claim 7 wherein the cap affixed within the openings is held in place via frictional forces.
9. The apparatus for collecting fluids of claim 1 wherein the flexible container is capable of containing used motor oil.
10. The apparatus for collecting fluids of claim 1 wherein the flexible container is a plastic bag.
11. The apparatus for collecting fluids of claim 1 wherein the flexible container is formed of material capable of withstanding temperatures of greater than approximately 250° F.
12. The apparatus for collecting fluids of claim 1 wherein the stiff outer container is collapsible.
13. The apparatus for collecting fluids of claim 1 wherein the stiff outer container is constructed of recyclable material.
14. The apparatus foe collecting fluids of claim 13 wherein the stiff outer container is constructed of cardboard.
15. The apparatus of claim 1 further comprising a removable insert configured to hold the flexible container in place.
16. The apparatus for collecting fluids of claim 1 wherein the stiff outer container and the removable scraper are integrally formed of a single piece of scored cardboard.
17. The apparatus for collecting fluids of claim 1 wherein the stiff outer container is coated with a resistant coating.
18. A method of collecting used oil from an automobile comprising:
    providing a container for collecting used oil including a stiff outer member having a recessed, slanted top surface with an opening that passes through and connects to a corresponding opening in a flexible container disposed within the cavity of the stiff outer member;
    removing a cap that seals the opening passing through the top and the flexible inner container;
    placing the assembled collection apparatus below a drain plug of the automobile;
    removing the drain plug and draining the used automotive oil onto the recessed top wherein the oil passes through the openings of the stiff outer member and the flexible member; and
    replacing the cap into the opening, sealing the used oil within the flexible container; and
    wherein the bottom has a removable section that is removed from the bottom concurrently with the removal of the cap and is used to scrape the used oil from the surface of the top and direct the oil through the opening after the oil is drained from the automobile.
19. The method of collecting used oil from an automobile of claim 18 wherein the stiff outer container has a first side, second side, third side, fourth side, each having an upper edge, the stiff outer container having a bottom and top wherein the top is recessed from the upper edge.
20. The method of collecting used oil from an automobile of claim 18 further comprising the step of taking the sealed collection apparatus to a recycling center to dispose of the entire assembly.
21. The method of collecting used oil from an automobile of claim 18 wherein the openings passing through the stiff outer container and the flexible member is positioned at a low point along the top.
22. The method of collecting used oil from an automobile of claim 18 wherein the exterior surface of the top and the interior surface of the first side, second side, third side, and fourth side above the top are treated with a surface coating.
23. The method of collecting used oil from an automobile of claim 22 wherein the surface coating masks discoloration of the stiff outer container caused by the fluids.
24. The method of collecting used oil from an automobile of claim 22 wherein the surface coating prevents the stiff outer container from absorbing the collected fluid.
25. The method of collecting used oil from an automobile of claim 18 wherein the cap affixes to the openings by being inserted into the openings.
26. The method of collecting used oil from an automobile of claim 25 wherein the cap affixed within the openings is held in place via frictional forces.

27. The method of collecting used oil from an automobile of claim 18 wherein the flexible container is capable of containing used motor oil.

28. The method of collecting used oil from an automobile of claim 18 wherein the flexible container is a plastic bag.

29. The method of collecting used oil from an automobile of claim 18 wherein the flexible container is formed of material capable of withstanding temperatures of greater than approximately 250° F.

30. The method of collecting used oil from an automobile of claim 18 wherein the stiff outer container is collapsible.

31. The method of collecting used oil from an automobile of claim 18 wherein the stiff outer container is constructed of recyclable material.

32. The method of collecting used oil from an automobile of claim 31 wherein the stiff outer container is constructed of cardboard.

33. The method of collecting used oil from an automobile of claim 18 wherein the stiff outer container is integrally formed of a single piece.

\* \* \* \* \*

UNITED STATES PATENT AND TRADEMARK OFFICE
CERTIFICATE OF CORRECTION

PATENT NO. : 7,913,721 B2  Page 1 of 1
APPLICATION NO. : 11/555528
DATED : March 29, 2011
INVENTOR(S) : John D. Henecke It is certified that error appears in the above-identified patent and that said Letters Patent is hereby corrected as shown below:

COL. 6, CLAIM 14, LINE 8:
DELETE after apparatus "foe"
ADD after apparatus --for--

Signed and Sealed this
Twenty-fourth Day of May, 2011

David J. Kappos
*Director of the United States Patent and Trademark Office*